Aug. 18, 1936.　　　A. P. BALL　　　2,051,284
WELDING TIP
Filed July 30, 1934
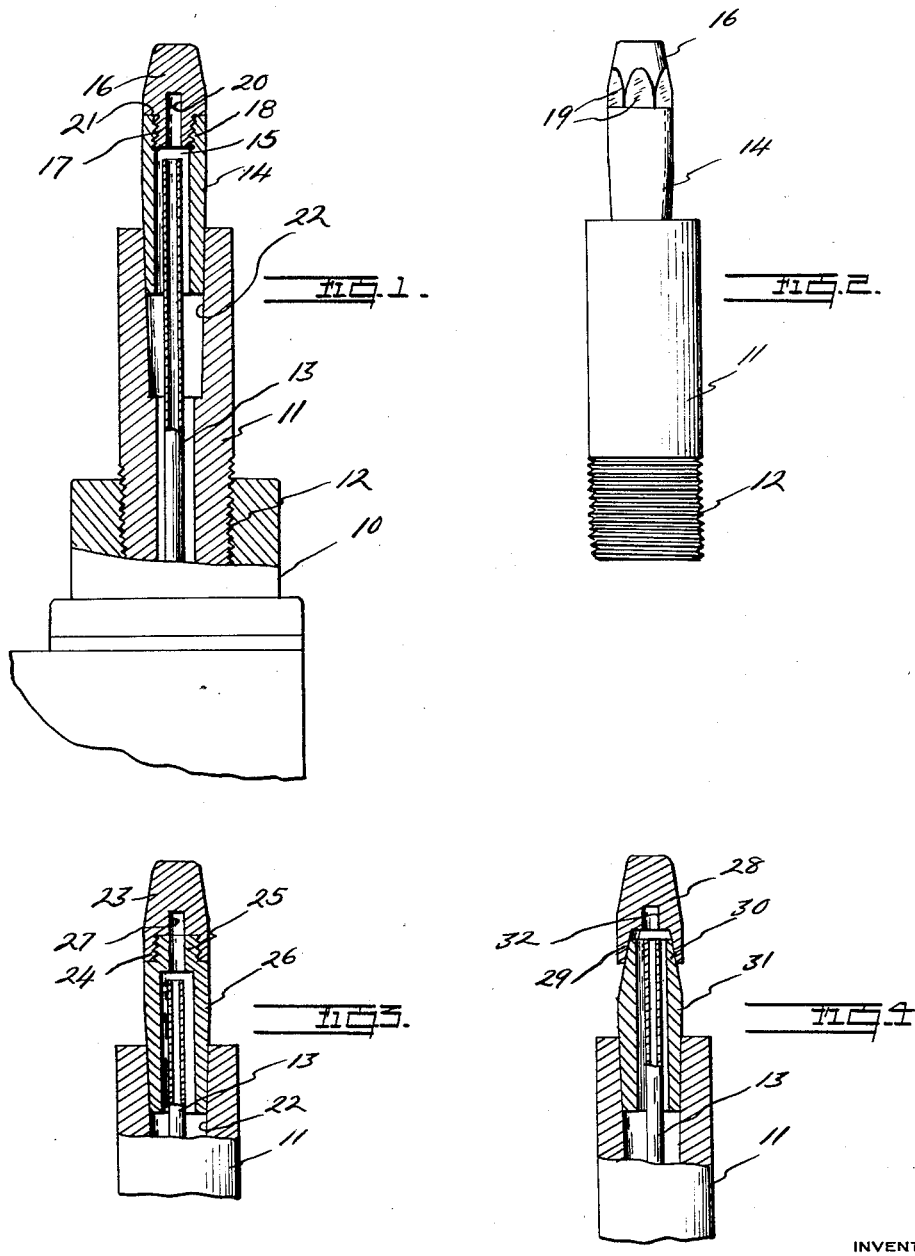
INVENTOR
Albert P. Ball Patented Aug. 18, 1936

2,051,284

UNITED STATES PATENT OFFICE 2,051,284

WELDING TIP

Albert P. Ball, Detroit, Mich., assignor to Briggs Manufacturing Company, Detroit, Mich., a corporation of Michigan Application July 30, 1934, Serial No. 737,670

1 Claim. (Cl. 219—4)

This invention relates to improvements in electrodes for welding machines and has as its objects to simplify, render more efficient and improve generally devices of this character.

One of the important objects of this invention is to provide a sectional welding electrode having a separate replaceable tip detachably secured to the body of the electrode so that as the tip becomes burned or worn away it may be readily replaced.

It is now generally the custom to water cool the electrodes of welding machines, and in accordance with this invention the water cooling passage in the removable tip is extended to a point sufficiently spaced from the adjacent end of the body of the electrode that the end of the water passage will be ruptured or exposed by the burning or wearing away of the tip prior to the burning away of the electrode down to the body thereof. Thus the escape of the cooling water acts as a signal to indicate that the tip of the electrode has been burned away to an extent which demands the replacement of the tip.

Another advantage resulting from my improved electrode is its economy in use. It is generally customary to make welding electrodes of pure copper or of copper alloy. In accordance with this invention, the tip only need be made of pure copper or of a suitable alloy, and the body thereof may be made of a cheaper material thus obtaining a considerable saving in cost of material.

Another economic advantage obtained by reason of my invention is that the body of the electrode, which comprises the major portion thereof, need not be thrown away but may be continuously used, it being necessary only to replace the tip which constitutes but a small portion thereof.

The several objects, advantages and novel details of construction of the invention will be made more apparent as this description proceeds, especially when considered in connection with the accompanying drawing, wherein Figure 1 is a fragmentary view of a portion of a welding machine showing my improved welding electrode associated therewith;

Figure 2 is an elevational view of an electrode holder with my improved electrode connected thereto;

Figure 3 is a sectional view through a modified form of my improved electrode, and Figure 4 is a similar view of another modified form thereof.

Referring now to the drawing, and more especially to Figures 1 and 2, it will be noted that there is fragmentarily illustrated a portion of a welding device or machine 10 having an electrode holder 11 secured thereto as, for instance, by means of screw threads 12. The reference character 13 indicates a tube which extends through the electrode holder and partly into the electrode for supplying a cooling medium such as water thereto, the cooling water generally flowing through the tube into the electrode and then back around the tube to the discharge side of the cooling system.

The reference character 14 indicates the body of my improved electrode which is preferably of hollow or tubular form to provide a central longitudinal passage 15 therethrough. As illustrated in Figure 1, the tube 13 of the cooling system extends into the passage or bore 15 of the electrode body 14.

The replaceable tip 16 of the electrode is adapted to be detachably secured to the body 14 and in the drawing several forms of detachable connections between these parts have been illustrated. In Figure 1, the tip 16 is shown as provided with an exteriorly threaded male portion 17 adapted to engage an interiorly threaded female portion 18 formed at the end of the electrode body 14. The tip is also preferably provided with a plurality of circumferentially arranged flattened portions 19 by means of which the tip may be engaged by a suitable tool for screwing the same into engagement with an electrode body, or for detaching the same therefrom.

As illustrated in Figure 1, the tip is provided with a bore or passage 20 extending from the threaded end thereof longitudinally of the tip to a point beyond the adjacent end 21 of the electrode body. This passage or bore 20 forms a continuation of the water cooling passage so that the cooling medium may be conducted into the tip to cool the same. By extending this passage beyond the end of the electrode body it will be ruptured or exposed when the tip has been worn or burned away to a point where it is proper to replace the same. Under such circumstances, the water which will leak from the water passage will act as a signal to indicate the necessity for replacing the tip, thus preventing injury to the body 14 of the electrode. It is obvious, however, that this is merely an added safeguard to prevent the wearing of the tip completely down to the electrode body as under ordinary conditions the tip will probably be replaced prior to having been worn away to this extent.

The electrode body 14 is preferably formed with a taper on the end opposite to the end 21 to fit tightly within the bore 22 of the holder 11.

The form of construction illustrated in Figure 3 is substantially the same as that heretofore described, with the exception that the tip 23 is formed with an interiorly threaded female portion 24 adapted to engage in an exteriorly threaded male portion 25 formed on the body 26 of the electrode. In this form of construction the water cooling bore or passage of the tip is indicated by the reference character 27 and communicates with the bore of the electrode body into which the water cooling tube 13 extends.

In Figure 4, still another form of detachable connection between the electrode body and replaceable tip is illustrated. In this form of construction the replaceable tip 28 is shown as being formed with a tapered female portion 29 adapted to tightly engage the tapered male portion 30 on the electrode body 31. In the forms of construction illustrated in Figures 3 and 4, the electrode body is shown as being provided with a standard taper fitting tightly into the electrode holder 11. In this latter form of construction, the water cooling tube 13 extends up into the bore in the electrode body, the replaceable tip being provided with a bore or passage 32 in communication therewith for receiving the cooling medium.

From the foregoing description, it will be readily apparent that a sectional welding electrode is provided in which the tip portion, which is subjected to the greatest wear, is replaceable and is readily detachably connected to the electrode body so as to be quickly replaceable when worn. Thus, as heretofore stated, a great saving of material is realized because the body may be used continuously as only the tip need be replaced. Moreover, only the tip need be formed of pure copper, copper alloy or relatively expensive metal, whereas the body may be formed of a cheaper material, if desired. In any event, with this construction, even if both the tip and body are made of the more expensive materials, greater economy is effected because only the tip of the electrode when worn need be replaced.

What I claim as my invention is:

A welding electrode comprising a body provided with a water cooling passage therethrough, a separate tip having one end detachably secured to the body and having a water cooling passage communicating with the water cooling passage of the body and extending into the end aforesaid of the tip a predetermined distance, and a water supply tube extending into the water cooling passage of the body and terminating short of the above mentioned end of the tip.

ALBERT P. BALL.